(12) United States Patent
Garrett et al.

(10) Patent No.: US 6,280,508 B1
(45) Date of Patent: Aug. 28, 2001

(54) PSA SYSTEMS

(75) Inventors: Michael Ernest Garrett, Woking Surrey; John Robert Coates, Farnham Surrey, both of (GB)

(73) Assignee: The BOC Group plc, Windlesham (GB)

(*) Notice: Subject to any disclaimer, the term of this patent is extended or adjusted under 35 U.S.C. 154(b) by 0 days.

(21) Appl. No.: 09/226,232

(22) Filed: Jan. 7, 1999

(51) Int. Cl.[7] .................................................. B01D 53/047
(52) U.S. Cl. .................................. 96/131; 96/151; 96/154
(58) Field of Search ........................... 95/117, 118, 139; 96/131, 132, 134–139, 149, 151, 154

(56) References Cited

U.S. PATENT DOCUMENTS

| | | | |
|---|---|---|---|
| 2,389,225 | * | 11/1945 | Wieczorek, Jr. et al. ............ 96/131 |
| 2,586,670 | * | 2/1952 | Lambertsen ............................ 96/149 |
| 2,593,132 | * | 4/1952 | Gannon ............................... 96/149 X |
| 2,669,318 | * | 2/1954 | Briggs ................................... 96/131 |
| 3,258,899 | * | 7/1966 | Coffin ................................ 96/130 X |
| 3,323,292 | * | 6/1967 | Brown ................................ 96/130 X |
| 3,353,339 | * | 11/1967 | Walter ................................... 96/137 |
| 4,029,486 | * | 6/1977 | Frantz ................................... 96/137 |
| 4,478,619 | * | 10/1984 | Arends et al. ..................... 96/137 X |
| 4,741,697 | * | 5/1988 | Herbison ........................... 96/131 X |
| 4,746,338 | * | 5/1988 | Williams ........................... 96/135 X |
| 4,770,678 | * | 9/1988 | Haslett, Jr. ........................ 96/131 X |
| 5,593,480 | * | 1/1997 | Pöschl ............................... 96/130 X |
| 5,865,998 | * | 2/1999 | Abraham et al. ................. 96/131 X |
| 5,910,165 | * | 6/1999 | Haramoto et al. ................ 96/151 X |

FOREIGN PATENT DOCUMENTS 60-137431  *  7/1985  (JP) ........................................ 96/131

* cited by examiner

Primary Examiner—Robert H. Spitzer
(74) Attorney, Agent, or Firm—Salvatore P. Pace

(57) ABSTRACT

A multi-bed PSA pressure vessel includes a hollow tubular body having one or more end plates releasably secured thereto. Secured to the end plate(s) are pipes which extend along the interior of the hollow tubular body. Each of the pipes terminates at a location along the length of the tubular body different from the remaining pipes. In a preferred embodiment, a plurality of perforated spacing flanges are secured to the pipe and some adjacent flanges defining between them a space for receiving adsorbing sieve material.

9 Claims, 4 Drawing Sheets

PSA SYSTEMS

BACKGROUND OF THE INVENTION

The present invention relates to pressure swing adsorption (PSA) techniques for the separation of a preselected gas or gases from a gas mixture including said gas or gases.

PSA techniques are used in a wide variety of applications where it is desired to separate a particular gas, for example, oxygen or nitrogen from a gas mixture containing oxygen or nitrogen, for example, air.

PSA techniques are also used when it is desired to control or modify an atmosphere in a container. For example, many refrigerated containers utilise a modified atmosphere for the transportation of produce such as foodstuffs. Fruit and vegetables when transported in closed containers frequently give off carbon dioxide and ethylene, the levels of which have to be controlled if the produce is to be maintained in a fresh, edible state. Known PSA systems for controlling or modifying the atmosphere in a container are frequently bulky and difficult to service and repair. Bulk is a problem particularly when the container whose atmosphere is to be controlled forms part of a land vehicle such as a lorry where space is at a premium. Carbon dioxide control in modified atmosphere containers is known to be effected by the use of a chemical such as sodalime which adsorbs excess carbon dioxide. The arrangement is such that the level or percentage by volume of carbon dioxide in the container is monitored and when a preselected level is reached, a fan circulates the gas mixture in the container over the sodalime which adsorbs the carbon dioxide. This continues until a preselected level of the carbon dioxide in the gas mixture is reached after which the fan is shut down.

This arrangement is simple but has a number of limitations in particular the disposal of the spent sodalime and its replacement.

It is an aim of the present invention to provide a multi-bed PSA pressure vessel which is relatively compact and easy to assemble and disassemble.

SUMMARY OF THE INVENTION

According to the present invention, a multi-bed PSA pressure vessel assembly comprises a hollow tubular body, an end plate releasably secured to an end of the hollow tubular body, the end plate having secured thereto at least two pipes extending into the hollow tubular body and each pipe terminating at a location along the length of the hollow tubular body different from the or the remaining pipes.

In a preferred embodiment a plurality of spacing flanges are secured to at least one of the pipes such that at least some adjacent spacing flanges define between them spaces for receiving adsorbing sieve material. The spacing flanges may be perforated to allow the passage therethrough of a gas.

BRIEF DESCRIPTION OF THE DRAWING

Embodiments of the invention will now be described, by way of example, reference being made to the Figures of the accompanying diagrammatic drawings in which.

DETAILED DESCRIPTION

Figure 1:
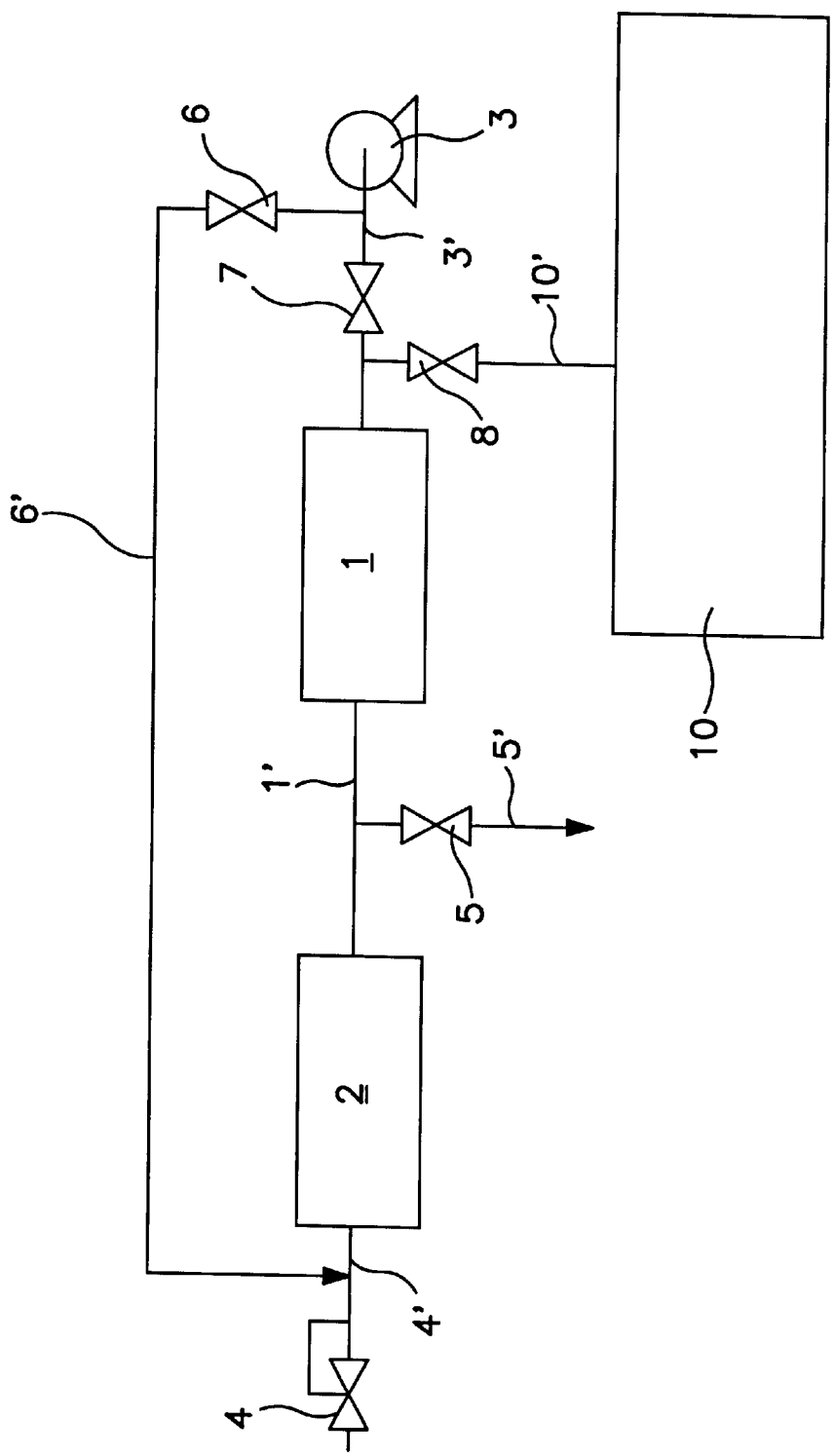
FIG. 1 is a schematic diagram of a PSA system for use in controlling or modifying the atmosphere in a closed container.

As shown in FIG. 1, a PSA system for controlling the atmosphere within a closed container 10 containing, for example fruit comprises a compressor 3 from which extends a pipe 3' to a first vessel 1 containing a water adsorbing material such as alumina or a water selective zeolite. Flow of gas through the pipe 3' is controlled by a valve 7. A pipe 10' extends from the pipe 3' and communicates with the interior of the container 10. The flow of gas through the pipe 10' is controlled by a valve 8. A pipe 1' extends between the first vessel 1 and a second vessel 2 containing a carbon dioxide adsorbing material. A pipe 5' extends from the pipe 1' and communicates with atmosphere. The flow of gas through the pipe 5' is controlled by a valve 5. A pipe 4' extends from the second vessel 2 and communicates with a pressure regulating valve 4. A further pipe 6' extends as shown from the pipe 3' at a location between the compressor 3 and the valve 7 to the pipe 4' at a location between the second vessel 2 and the pressure regulating valve 4.

In use, when a predetermined level of carbon dioxide has been reached in the container 10, the compressor 3 will be activated causing the gas mixture atmosphere in the container 10 to pass along the pipe 10' through open valve 8 and into the first vessel 1 where the gas mixture is dried. The dried gas mixture then passes through the pipe 1' and enters the second vessel 2 where the carbon dioxide is adsorbed. At this stage, valves 5 and 6 are closed. The adsorption pressure in the second vessel 2 is maintained by the pressure regulating valve 4.

After several minutes of operation of the compressor 3 the sieve of carbon dioxide adsorbing material in vessel 2 will be saturated with carbon dioxide and will require regeneration. This is achieved by opening the valves 5 and 6, and closing valve 7. Compressed gas now flows via pipe 6' to the second vessel 2 and passes the desorbed gas to atmosphere via pipe 5'. When the sieve in the vessel 2 has been regenerated, valve 5 is closed thereby diverting gas through pipe 1' to the first vessel 1. Valve 8 is then opened so that the gas passes from first vessel 1 through valve 8 and pipe 10' to return to the interior of the container 10 with water vapour from the vessel 1.

This cycle is repeated until the carbon dioxide level in the interior of the container 10 reaches a predetermined lower level.

This system although effective to control the level of carbon dioxide within the container 10 is bulky, requiring two vessels 1 and 2 with all the associated valves and pipe work.

The present invention is concerned with a PSA system which is similar in operation to that described with reference to FIG. 1 but which is less bulky and relatively easy to assemble and dismantle.

Figure 2:
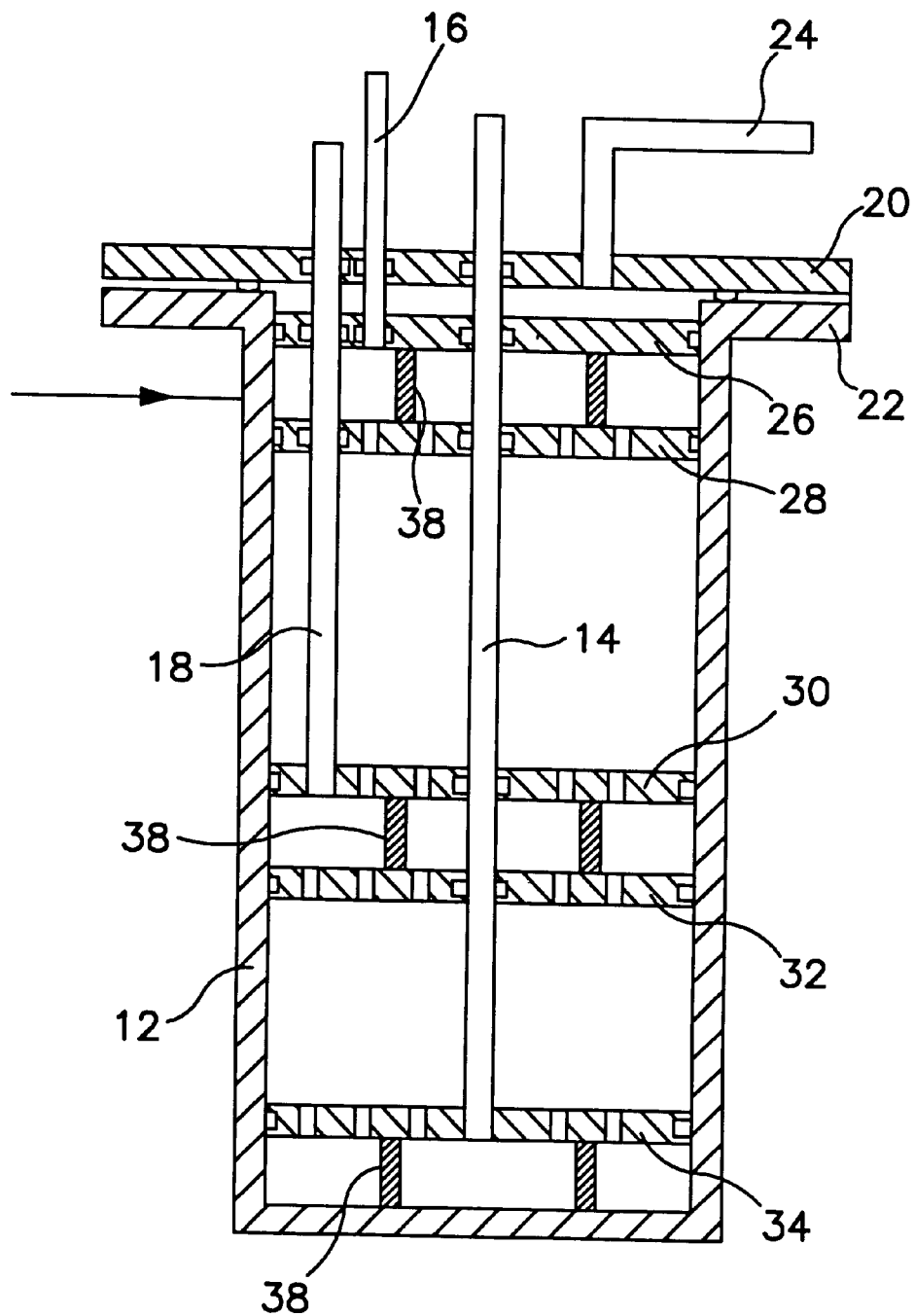
FIG. 2 is a schematic cross-sectional view through a first embodiment of a multi-bed PSA pressure vessel assembly according to the present invention.

As shown in FIG. 2, a multi-bed PSA pressure vessel assembly includes a hollow tubular body 12 in the form of a generally right circular cylinder closed at its lower (as shown) end and in use closed at its opposite upper (as shown) end by an end plate 20. The end plate 20 is releasably connected by bolts or studs (not shown) to a flange 22 surrounding the open upper end of the body 12. Rigidly connected to the end plate 20 are pipes 14, 16, 18 and 24 which depend therefrom and into the body 12. Each pipe 14, 16, 18 and 24 terminates at a different location within the body 12.

Mounted on the central (as shown) pipe 14 are five separating flanges 26, 28, 30, 32 and 34. The separating flanges are perforated to permit the passage therethrough of gas and may be enveloped in a gauze skin. The separating flanges are made from a resilient material and adjacent flanges 26, 28 and 30, 32 are held apart by resilient spacers 38. The separating flange 34 is spaced from the closed lower end of the body 12 again by resilient spacers 38. The space between flanges 32 and 34 is filled with a water adsorbing sieve; and the space between flanges 28 and 30 is filled with a carbon dioxide adsorbing sieve.

The mode of operation is similar to that described with reference to the PSA system of FIG. 1 in that atmospheric feed air from the container is pumped by the compressor down the pipe 14 into the space between the separating flange 34 and the closed end of the body 12. The gas then rises through the perforations in flange 34 and any water/water vapour is adsorbed by the water adsorbing sieve located between the separating flanges 32 and 34. The dried gas then passes up through the perforations in flanges 32 and 30 to enter the carbon dioxide adsorbing sieve material where carbon dioxide is removed from the gas. Ultimately, dry gas relatively free from carbon dioxide is passed back to the container via the pipe 16. Pipe 24 is fitted with a pressure regulating valve (not shown) to maintain the absorption pressure in the vessel 12.

After several minutes of operation of the compressor, the sieve of carbon dioxide adsorbing material in the space between the separating flanges 28, 30 will be saturated with carbon dioxide and will require regeneration. This is achieved by passing a purge gas from the compressor down the pipe 18 some of which gas will pass through the separating flanges 32 and 34 where it will entrain moisture and then pass up through the pipe 14 to be returned to the container. The remaining gas will pass up through the spacing flange 30 through the carbon dioxide adsorbing sieve through the separating flange 28 and into pipe 16 where the gas stream will be diverted to atmosphere.

Any propensity for the sieve material to be fluidised is dampened by introducing a gas under pressure through the pipe 24 and into the header space above the separating flange 26 and the lower surface of the endplate 20. The gas pressure above the separating flange 26 will cause it to flex which in turn will cause the spacers 38 to flex and the remaining separating flanges thereby compacting the sieve material between them and effectively locking the beds of sieve material in place.

When replacing the sieve material during routine maintenance or repairing/unblocking the perforated flanges 26 to 34 all that is necessary is access to one (the top as shown) end of the pressure vessel assembly. In order to dismantle the assembly, the bolts/studs holding the flanges 20, 22 together are undone after which the flange 20 together with the connected pipes 14, 16, 18 and 24 and separating flanges 26, 28, 30, 32 and 34 can be withdrawn from the body 12 for access to the interior thereof.

Figure 3:
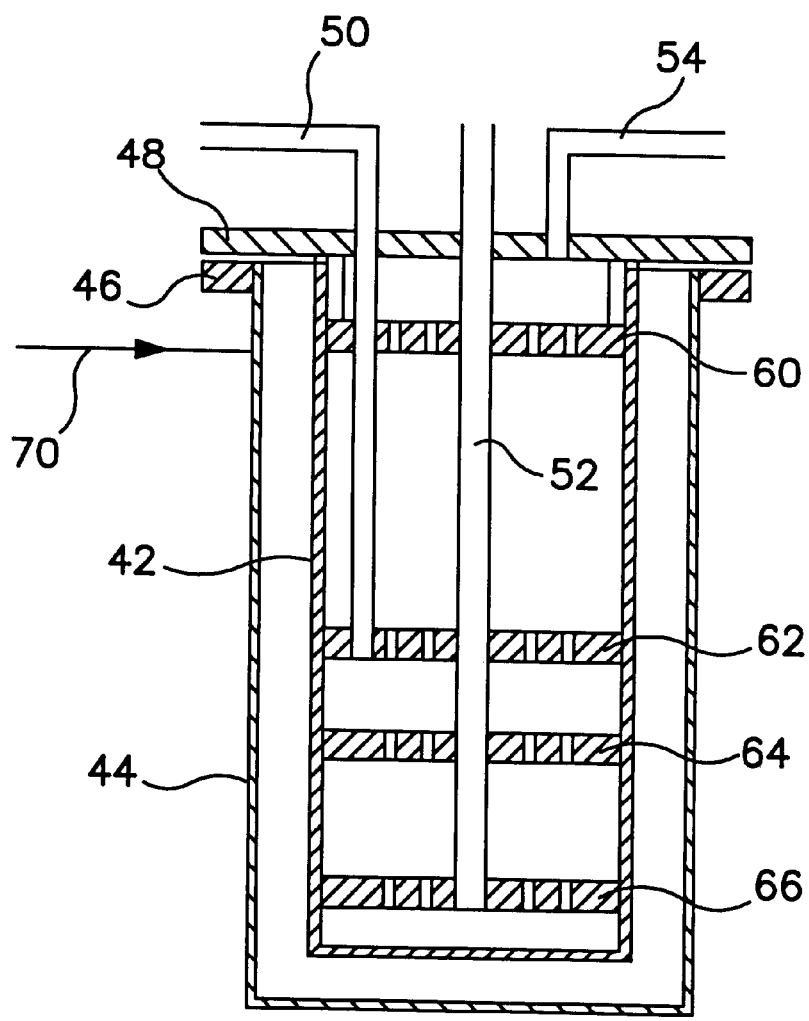
FIG. 3 is a schematic cross-sectional view through a second embodiment of a multi-bed PSA pressure vessel assembly.
Figure 4:
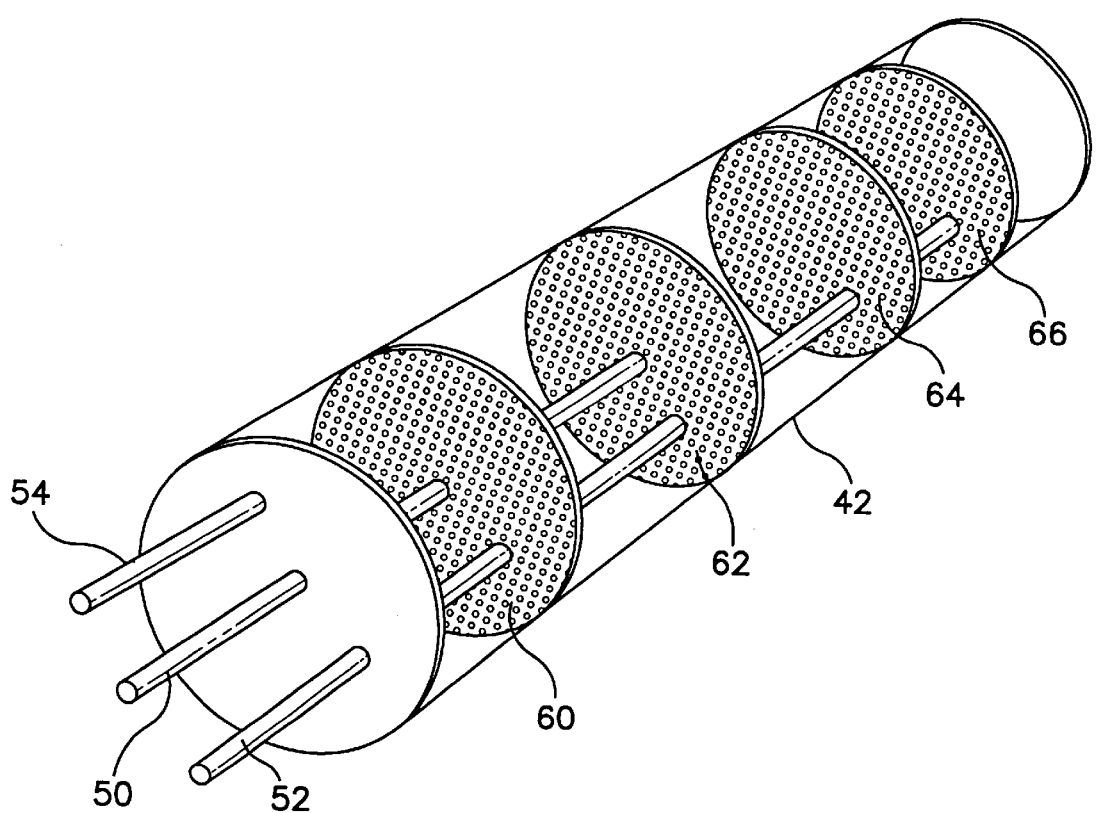
FIG. 4 is a perspective detail of the embodiment shown in FIG. 3.

Referring now to FIGS. 3 and 4, the multi-bed pressure vessel assembly includes a hollow tubular body 42 in the form of a flexible tube closed at its lower (as shown) end and located in an outer vessel 44. The outer vessel 44 at its upper (as shown) end is formed with a flange 46 to which is releasably attached in a gas tight manner an end plate 48. As shown, the end plate 48 closes off the upper end of the body 42. Rigidly fixed to the end plate 48 are three pipes 50, 52 and 54 which depend from the end plate 48 and into the interior of the pressure vessel 42. Each pipe 50, 52 and 54 terminates at a difference location within the body 42.

Attached to the central pipe 52 are four spacing flanges 60, 62, 64 and 66. The spacing flanges are perforated to allow the passage therethrough of gas and each may be enveloped in a gauze material. A water adsorbing sieve material is positioned between the spacing flanges 64 and 66 and a carbon dioxide adsorbing material is positioned between the spacing flanges 60 and 62. A conduit 70 extends through the outer vessel 44 and communicates with the space defined by the inner surface of the outer vessel 44 and the outer surface of the body 42.

In use, when the level of carbon dioxide reaches a predetermined level in the container (not shown), a compressor is activated, as with the previously described embodiments, which passes the gases in the container down the central pipe 52. The gases will then rise through the perforations in the spacing flange 66 and through the bed/sieve of water/water vapour adsorbing material where it is dried. The dried gas then passes up through the perforations in the spacing flanges 64 and 62 and passes through the bed/sieve of carbon dioxide adsorbing material where substantially all the carbon dioxide is removed from the gas. Ultimately, the gas passes through the perforations in the spacing flange 60 to exit the body 42 via the pipe 54 en route back to the interior of the container.

After several minutes the carbon dioxide sieve material will require regeneration and this is achieved by stopping the flow of gas down the pipe 52 and passing a purge gas down pipe 50. Some of the purge gas will pass downwardly through the perforations in the spacing flange 64, through the water adsorbing sieve material and hence through the perforations in the spacing flange 66 to return moist gas up the pipe 52 to the interior of the container.

The remaining purge gas will pass upwardly through the perforations in the spacing flange 62 and hence through the carbon dioxide adsorbing sieve. The purge gas together with desorbed carbon dioxide then passes through the perforations in the spacing flange 60 to exit the body 42 via pipe 54 where it is vented to atmosphere.

In order to prevent fluidisation of the sieve material in the flexible body 42 gas under pressure is passed through the conduit 70 to exert a force on the outer surface of said flexible body for locking the beds of sieve material in place.

As described with reference to FIG. 2, routine maintenance and the repair of the pressure vessel assembly is rendered relatively easy in that by releasing the end plate 48 from the flange 46 access is readily available to the separating flanges and the interior of the flexible body 42.

Although in the above described embodiments reference has been made, by way of example, to using a carbon dioxide adsorbing sieve for removing carbon dioxide from a gas mixture, clearly other sieve materials can be used to remove other gases. For example, an ethylene adsorbing sieve could be used in place of or together with the carbon dioxide adsorbing sieve to remove ethylene.

Furthermore, although reference has been made to spacing flanges these are not essential since if the particle sizes of the respective sieve materials are similar no mechanical interface is necessary.

Alternatively, the sieve materials could be separated, for example, by ceramic particles or balls which are non-reactive to the gases passing through the hollow tubular body of the pressure vessel assembly.

We claim:

1. A multi-bed PSA pressure vessel assembly comprising:
    a hollow tubular body containing a plurality of adsorption beds;

an end plate releasably secured to an end of the hollow tubular body; and at least two pipes secured to said end plate and extending into the hollow tubular body, each of said pipes terminating within said hollow tubular body at a location along the length of the hollow tubular body different from the remaining pipes.

2. The multi-bed PSA pressure vessel assembly as claimed in claim 1, further comprising a plurality of spacing flanges secured to at least one of the pipes such that at least some adjacent spacing flanges define between them spaces for receiving adsorbing sieve material thereby defining said plurality of absorption beds.

3. The multi-bed PSA pressure vessel assembly as claimed in claim 2, in which the spacing flanges are perforated to allow the passage there through of a gas.

4. The multi-bed PSA pressure vessel assembly as claimed in claim 2, in which the spacing flanges are made from resilient material.

5. The multi-bed PSA pressure vessel assembly as claimed in claim 4, in which some of the adjacent spacing flanges are separated by resilient spacers.

6. The multi-bed PSA pressure vessel assembly as claimed in claim 1, in which the hollow tubular body is rigid and also includes a flange at said end to which is releasably secured the end plate.

7. The multi-bed PSA pressure vessel assembly as claimed in claim 6, in which a header space is defined between the end plate and the spacing flange located immediately adjacent thereto, the header space communicates with a pipe secured to the end plate for passage of a gas under pressure to lock said plurality of aborption beds in place.

8. The multi-bed PSA pressure vessel assembly as claimed in claim 1, in which the hollow tubular body is in the form of a flexible tube.

9. The multi-bed PSA pressure vessel assembly as claimed in claim 8 in which the flexible tube is located in an outer vessel, a space is defined between the flexible tube and said outer vessel, and a conduit communicates with the space for the passage of a gas under pressure for locking said plurality of adsorption beds in place.

\* \* \* \* \*